United States Patent
Matsumura et al.

(10) Patent No.: US 9,144,788 B2
(45) Date of Patent: Sep. 29, 2015

(54) EXHAUST GAS PURIFICATION CATALYST AND METHOD FOR PRODUCING THE SAME

(71) Applicant: MAZDA MOTOR CORPORATION, Hiroshima (JP)

(72) Inventors: Yasuhiro Matsumura, Hiroshima (JP); Akihide Takami, Hiroshima (JP); Masahiko Shigetsu, Higashi-Hiroshima (JP); Hisaya Kawabata, Hiroshima (JP); Masaaki Akamine, Hiroshima (JP); Yuki Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/183,352

(22) Filed: Feb. 18, 2014

(65) Prior Publication Data

US 2014/0235434 A1 Aug. 21, 2014

(30) Foreign Application Priority Data

Feb. 21, 2013 (JP) ................................. 2013-031868

(51) Int. Cl.
| | |
|---|---|
| B01J 23/00 | (2006.01) |
| B01J 23/02 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 20/00 | (2006.01) |
| B01J 21/04 | (2006.01) |
| B01J 23/63 | (2006.01) |
| B01J 37/02 | (2006.01) |
| B01J 37/03 | (2006.01) |
| B01J 37/16 | (2006.01) |

(Continued)

(52) U.S. Cl.
CPC ............... *B01J 23/63* (2013.01); *B01D 53/945* (2013.01); *B01J 35/0006* (2013.01); *B01J 37/0201* (2013.01); *B01J 37/0244* (2013.01); *B01J 37/031* (2013.01); *B01J 37/16* (2013.01); *B01D 2255/1023* (2013.01); *B01D 2255/1025* (2013.01); *B01D 2255/407* (2013.01); *B01D 2255/9022* (2013.01); *B01D 2258/014* (2013.01); *B01J 2523/00* (2013.01)

(58) Field of Classification Search
CPC ............ B01J 21/04; B01J 21/06; B01J 23/10; B01J 23/44; B01J 23/46; B01J 23/56; B01J 23/63
USPC ......... 502/302–304, 327, 332, 333, 339, 349, 502/355, 415, 439
See application file for complete search history.

(56) References Cited

U.S. PATENT DOCUMENTS 5,318,757 A * 6/1994 Abe et al. ....................... 422/174
6,150,288 A * 11/2000 Suzuki et al. .................. 501/105

(Continued)

FOREIGN PATENT DOCUMENTS

JP 2003-265958 A 9/2003

*Primary Examiner* — Cam N. Nguyen
(74) *Attorney, Agent, or Firm* — Studebaker & Brackett PC

(57) ABSTRACT

An exhaust gas purification catalyst includes a Rh-containing catalyst layer provided on a base material. The Rh-containing catalyst layer includes a binder material of Rh-doped CeZr-based composite oxide containing Ce and Zr and doped with Rh. The binder material has been previously subjected to a reduction treatment.

5 Claims, 4 Drawing Sheets

(51) Int. Cl.
  *B01J 35/00*   (2006.01)
  *B01D 53/94*   (2006.01)

(56) References Cited

U.S. PATENT DOCUMENTS

| | | | |
|---|---|---|---|
| 6,221,804 B1 * | 4/2001 | Yamada et al. | 502/326 |
| 6,306,794 B1 * | 10/2001 | Suzuki et al. | 502/304 |
| 6,335,305 B1 * | 1/2002 | Suzuki et al. | 502/325 |
| 6,620,762 B2 * | 9/2003 | Tan et al. | 502/304 |
| 6,756,336 B2 * | 6/2004 | Kasahara et al. | 502/65 |
| 6,767,855 B2 * | 7/2004 | Kasahara et al. | 502/66 |
| 6,896,857 B2 * | 5/2005 | Nakamura et al. | 423/213.5 |
| 7,175,822 B2 * | 2/2007 | Nakatsuji | 423/239.1 |
| 7,235,511 B2 * | 6/2007 | Kawamoto et al. | 502/327 |
| 7,265,073 B2 * | 9/2007 | Yoshikawa | 502/66 |
| 7,473,665 B2 * | 1/2009 | Kawai et al. | 502/217 |
| 7,737,077 B2 * | 6/2010 | Kitamura et al. | 502/326 |
| 7,875,250 B2 * | 1/2011 | Nunan | 422/177 |
| 7,977,276 B2 * | 7/2011 | Kikuchi et al. | 502/325 |
| 7,998,896 B2 * | 8/2011 | Kitamura et al. | 502/326 |
| 8,158,554 B2 * | 4/2012 | Wakamatsu et al. | 502/326 |
| 8,202,819 B2 * | 6/2012 | Kohara et al. | 502/304 |
| 8,309,488 B2 * | 11/2012 | Kitamura et al. | 502/326 |
| 8,491,847 B2 * | 7/2013 | Kato et al. | 422/177 |
| 8,544,261 B2 * | 10/2013 | Mori et al. | 60/299 |
| 8,580,705 B2 * | 11/2013 | Aoki et al. | 502/304 |
| 8,609,578 B2 * | 12/2013 | Nakamura et al. | 502/327 |
| 8,673,809 B2 * | 3/2014 | Nakatsuji et al. | 502/327 |
| 8,697,600 B2 * | 4/2014 | Nobukawa et al. | 502/327 |
| 8,721,976 B2 * | 5/2014 | Sahara | 422/177 |
| 2003/0050189 A1 | 3/2003 | Morikawa et al. | |

* cited by examiner

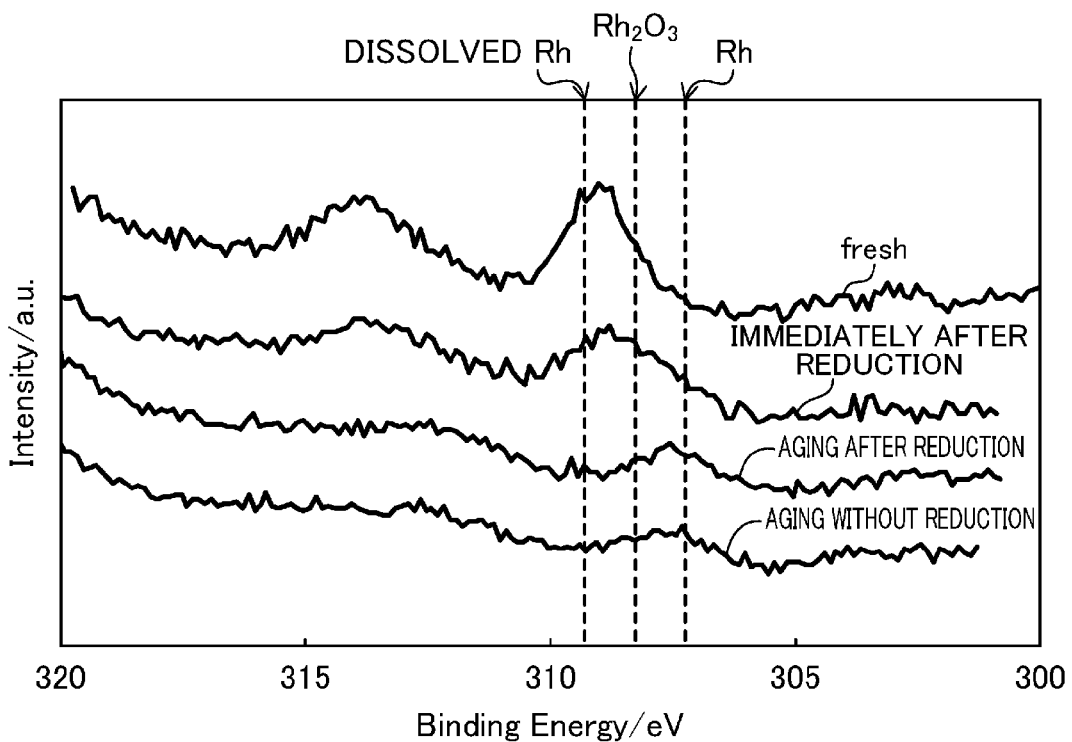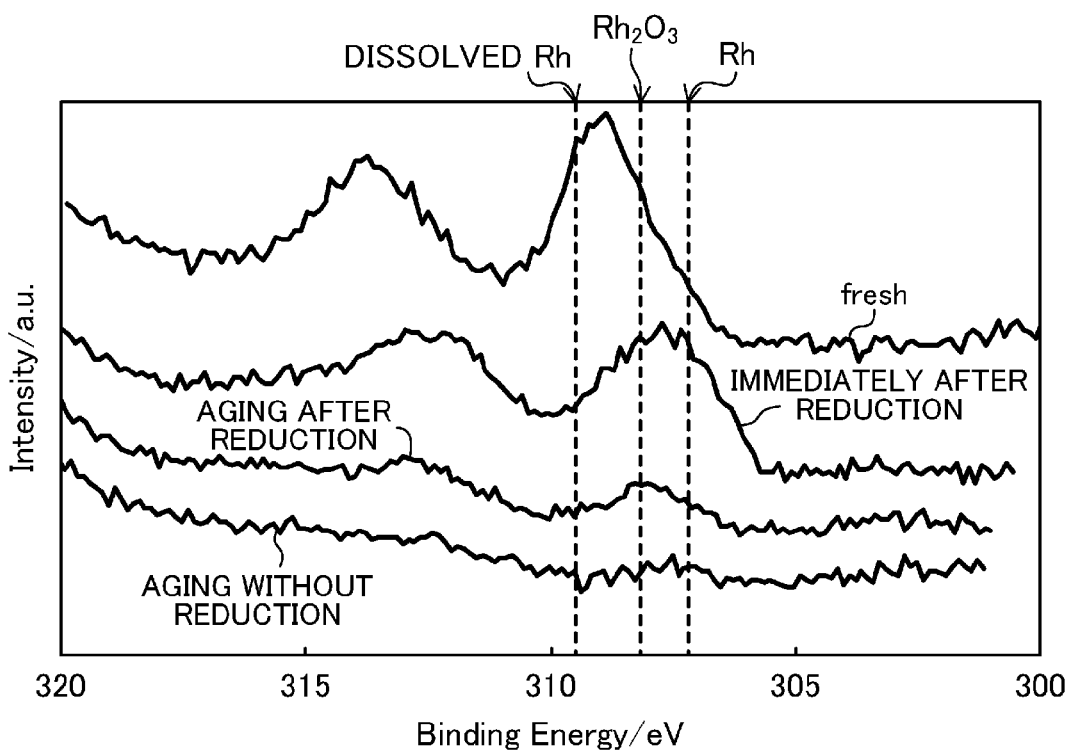

EXHAUST GAS PURIFICATION CATALYST AND METHOD FOR PRODUCING THE SAME

CROSS-REFERENCE TO RELATED APPLICATION

This application claims priority to Japanese Patent Application No. 2013-031868 filed on Feb. 21, 2013, the entire disclosure of which is incorporated by reference herein.

BACKGROUND

The present disclosure relates to exhaust gas purification catalysts and methods for producing the catalysts.

Exhaust gas purification catalysts (three-way catalysts) loading catalytic metals, such as Pt, Pd, or Rh, on oxide supports have been used in order to purify hazardous substances, such as hydrocarbon (HC), carbon monoxide (CO), and nitrogen oxide ($NO_x$), emitted from automobile engines.

The exhaust gas purification catalysts include, for example, a catalyst loading Pt on $CeO_2$. This catalyst is known to have a large oxygen storage/release capacity and show excellent performance in oxidizing and purifying CO and HC. The catalyst can efficiently generate $H_2$ through a water gas shift reaction and, thus, promote reduction purification of $NO_x$ by using $H_2$ generated.

An exhaust gas purification catalyst becomes active at a predetermined temperature, and can purify the hazardous substances described above in exhaust gas into a nontoxic gas through oxidization or reduction. However, in an initial period of starting up an engine in which the engine is not warmed up enough yet, the temperature of the exhaust gas is low, and thus, the catalyst does not become active. Accordingly, in this initial period, hazardous substances in the exhaust gas are emitted to the air without being purified. To prevent such emission, catalysts that become active at low temperatures, i.e., exhibit excellent exhaust gas purification performance, have been in demand.

Japanese Unexamined Patent Publication No. 2003-265958 describes a catalytic material which is loaded with a precious metal as a catalytic metal on a composite oxide containing $CeO_2$ and $ZrO_2$ as main components and on which a heat treatment has been performed at 600° C. to 1000° C. in a reduction atmosphere. In the catalytic material of Japanese Unexamined Patent Publication No. 2003-265958, a precious metal performs storage/release of lattice oxygen of $CeO_2$, oxygen can be released in a reduction atmosphere even at low temperatures, and thus, the catalytic material can exhibit excellent purification performance of exhaust gas.

SUMMARY

Exhaust gas purification catalysts as those described above degrade their purification performance to hazardous substances when being exposed to high-temperature exhaust gas in some cases. This is because the surface area of a catalytic metal in contact with exhaust gas decreases due to agglomeration of particles of the catalytic metal supported on a support and/or dissolution of the catalytic metal in the support and, thereby, the number of active sites of the catalyst decreases. Consequently, hazardous substances in the exhaust gas are insufficiently purified, and are released to the air.

Among the catalytic metals described above, Rh is known to have a $NO_x$ reduction function and a partial oxidation function of HC and CO. However, when Rh is oxidized, the $NO_x$ reduction function deteriorates, whereas when Rh is completely reduced, the partial oxidation function of HC and CO deteriorates. In this manner, the catalyst performance varies depending on properties of Rh. The catalyst performance also affects properties of a Rh-supporting support. To obtain highly efficient exhaust gas purification performance with a catalyst activity at low temperatures, Rh having properties excellent enough to show optimum catalyst performance needs to be supported on a support suitable for improving catalyst performance by increasing the number of active sites of the catalyst.

It is therefore an object of the present disclosure to provide a catalyst that becomes active even at low temperatures and has catalyst performance excellent enough to purify hazardous substances in exhaust gas efficiently.

Intensive investigation and study by inventors of the present disclosure show that an exhaust gas purification catalyst containing a composite oxide obtained by reducing Rh-containing CeZr-based composite oxide in which Rh is contained in CeZr-based composite oxide including Ce and Zr as a binder becomes active even at low temperatures and efficiently purifies hazardous substances in exhaust gas.

Specifically, an exhaust gas purification catalyst according to the present disclosure is an exhaust gas purification catalyst in which a Rh-containing catalyst layer is located on a base material. The Rh-containing catalyst layer includes Rh-doped binder material in which Rh is contained in CeZr-based composite oxide containing Ce and Zr. The Rh-doped binder material has been previously subjected to a reduction treatment.

In the exhaust gas purification catalyst, Rh-containing catalyst layer includes the binder material configured to be bonded to the base material or another catalyst layer, and this binder material also has a catalytic function. An essential function of the binder material is to bind the catalyst layer to the base material or another catalyst layer. Since the Rh-doped binder material of the Rh-containing catalyst layer of the above catalyst is made of Rh-containing CeZr-based composite oxide, this Rh-doped binder material can also be used as a catalytic material. That is, since the CeZr-based composite oxide is supposed to have an oxygen storage/release capacity and cause an oxygen exchange reaction so as to release a large amount of reactive oxygen species and Rh contributes to oxygen storage/release and an oxygen exchange reaction, the released reactive oxygen species can promote oxidation purification of CO and HC.

The Rh-doped binder material is previously subjected to a reduction treatment, and Rh particles in a reduced state are deposited as a metal Rh on the surface of a support, in general. In addition, Rh in a metal state is considered to contribute to excellent catalytic reactions. Thus, performing a reduction treatment on the binder material causes the metal Rh to be dispersed on the surface of the CeZr-based composite oxide, thereby increasing the surface area of Rh in contact with exhaust gas. Accordingly, the number of active sites of the catalyst increases. As a result, the catalyst can exhibit excellent catalyst performance even at low temperatures, and thus, can efficiently purify exhaust gas.

In the exhaust gas purification catalyst, the reduction treatment is preferably performed at a temperature of 500° C. to 800° C., both inclusive, in a reduction atmosphere containing CO.

In this case, a large amount of Rh in the Rh-doped binder material in the Rh-containing catalyst layer can be dispersed as a metal Rh over the surface of the CeZr-based composite oxide. Consequently, the surface area of Rh in contact with exhaust gas increases, and the number of active sites increases accordingly. As a result, exhaust gas can be efficiently purified.

In the exhaust gas purification catalyst, the Rh-containing catalyst layer preferably includes Rh-supporting Zr-based composite oxide in which Rh is supported on Zr-based composite oxide containing Zr and a rare earth metal except Ce and Rh-supporting CeZr-based composite oxide in which Rh is supported on CeZr-based composite oxide containing Zr and Ce.

In this case, since the Zr-based composite oxide shows oxygen ion conduction, reactive oxygen species can be released by the oxygen ion conduction, thereby promoting oxidation purification of HC and CO. The Rh-supporting Zr-based composite oxide promotes a steam reforming reaction. This reaction generates $H_2$, thereby also promoting reduction purification of $NO_R$. In addition, since the CeZr-based composite oxide is supposed to have an oxygen storage/release capacity and cause an oxygen exchange reaction so as to release a large amount of reactive oxygen species and Rh contributes to oxygen storage/release and an oxygen exchange reaction, the released reactive oxygen species can promote oxidation purification of CO and HC. As a result, purification performance of exhaust gas can be enhanced.

In the exhaust gas purification catalyst, a Pd-containing catalyst layer is preferably provided between the Rh-containing catalyst layer and the base material.

The Pd-containing catalyst layer shows a strong oxidation capacity at low temperatures. Thus, when CO or HC partially oxidized by the Rh-containing catalyst layer flows into this Pd-containing catalyst layer, oxidation purification of CO or HC can be efficiently performed.

A method for producing an exhaust gas purification catalyst according to the present disclosure is directed to a method for producing an exhaust gas purification catalyst in which a Rh-containing catalyst layer is located on a base material. The method includes: providing a Pd-containing catalyst layer on a surface of the base material; preparing Rh-supporting Zr-based composite oxide in which Rh is supported on Zr-based composite oxide containing Zr and a rare earth metal except Ce, Rh-supporting CeZr-based composite oxide in which Rh is supported on CeZr-based composite oxide containing Zr and Ce, and Rh-doped CeZr-based composite oxide obtained by dissolving Rh in CeZr-based composite oxide serving as a binder material; performing a heat treatment on the Rh-doped CeZr-based composite oxide at a temperature of 500° C. to 800° C., both inclusive, in a reduction atmosphere containing CO, thereby preparing a Rh-doped binder material; mixing the Rh-supporting Zr-based composite oxide, the Rh-supporting CeZr-based composite oxide, and the Rh-doped binder material together to produce a mixture, and making the mixture into slurry, thereby preparing a Rh-containing catalytic material; and providing the Rh-containing catalytic material on a surface of the Pd-containing catalyst layer.

In the method for producing an exhaust gas purification catalyst, the Rh-doped CeZr-based composite oxide in which Rh is dissolved in CeZr-based composite oxide is used as a Rh-doped binder material in the Rh-containing catalyst layer, and is subjected to a reduction treatment in a CO-containing reduction atmosphere at a temperature of 500° C. to 800° C., both inclusive. Thus, a metal Rh can be deposited and dispersed over the surface of the CeZr-based composite oxide. As a result, a large number of catalyst active sites can also be provided in the binder material, thereby obtaining an exhaust gas purification catalyst showing excellent exhaust gas purification performance.

In addition, in this method, since the Rh-supporting Zr-based composite oxide is used as a catalytic material and the Zr-based composite oxide shows oxygen ion conduction as described above, reactive oxygen species can be released by the oxygen ion conduction, thereby contributing to oxidation purification of HC and CO. The Rh-supporting Zr-based composite oxide promotes a steam reforming reaction, generates $H_2$, and also contributes to reduction purification of $NO_x$. Thus, a catalyst having excellent purification performance of exhaust gas can be obtained.

An exhaust gas purification catalyst and a method for producing the catalyst according to the present disclosure can allow a large amount of a metal Rh to be dispersed on the surfaces of composite oxide particles in a binder material of a catalyst layer and shows excellent purification performance of exhaust gas with a large number of active sites.

BRIEF DESCRIPTION OF THE DRAWINGS

FIGS. 3A and 3B are graphs showing changes in properties of Rh caused by a reduction treatment on a Rh-doped binder material analyzed by X-ray photoelectron spectroscopy (XPS), FIG. 3A shows a case using $CeZrNdO_x$ as a binder material, and FIG. 3B shows a case using Rh-supporting $CeZrNdO_x$ as a binder material.

FIG. 4A shows a comparison of heat treatment temperatures, and FIG. 4B shows a comparison of heat treatment times.

DETAILED DESCRIPTION

An embodiment of the present disclosure will be described with reference to the drawings. The following embodiment is merely a preferred example in nature, and is not intended to limit the scope, applications, and use of the invention.

(Catalyst Layer Structure)

Figure 1:
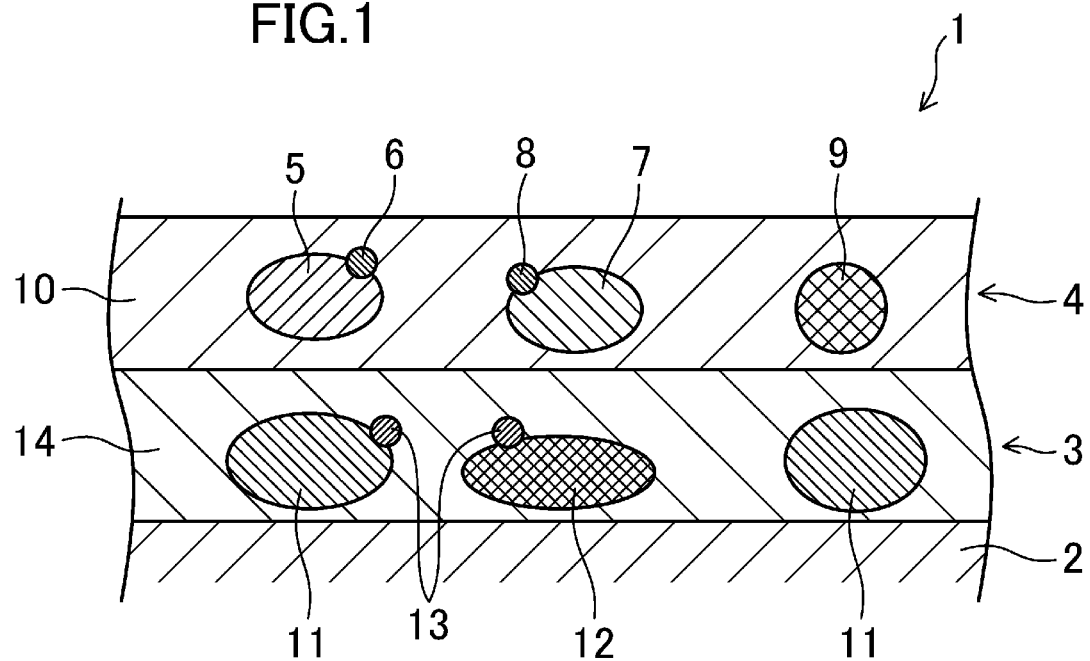
FIG. 1 is a cross-sectional view illustrating a catalyst layer structure of an exhaust gas purification catalyst according to an embodiment of the present disclosure.

A structure of a catalyst layer of an exhaust gas purification catalyst according to an embodiment of the present disclosure will be described with reference to FIG. 1. FIG. 1 is a cross-sectional view illustrating the structure of the catalyst layer of the exhaust gas purification catalyst of this embodiment.

As illustrated in FIG. 1, an exhaust gas purification catalyst 1 of this embodiment is provided on a base material (a honeycomb support) 2 constituting a wall of an exhaust gas passage from an engine of an automobile. Specifically, the exhaust gas purification catalyst 1 includes: a Pd-containing catalyst layer (a lower layer) 3 provided on the base material 2; and a Rh-containing catalyst layer (an upper layer) 4 facing the exhaust gas passage. In other words, the Pd-containing catalyst layer 3 is located between the base material 2 and the Rh-containing catalyst layer 4.

The Rh-containing catalyst layer 4 includes, as catalytic materials, Rh-supporting Zr-based composite oxide in which Rh6 is supported on Zr-based composite oxide 5 containing Zr and a rare earth metal except Ce and Rh-supporting CeZr-based composite oxide in which Rh8 is supported on CeZr-based composite oxide 7 containing Zr and Ce. The Rh-containing catalyst layer 4 preferably additionally includes alumina particles 9. The alumina particles 9 contribute to an increase in thermal resistance of the Rh-containing catalyst layer 4 facing the exhaust gas passage. The alumina particles 9 may contain a rare-earth element, and for example, includes 4 mass % of $La_2O_3$ in this embodiment.

The Rh-containing catalyst layer 4 includes, as a binder material, a Rh-doped binder material 10 in which Rh is added to CeZr-based composite oxide containing Zr and Ce. In this embodiment, the Rh-doped binder material 10 is prepared by performing a reduction treatment on Rh-doped CeZr-based composite oxide in which dissolved Rh is added to CeZr-based composite oxide. This reduction treatment provides the Rh-doped binder material 10 with excellent catalyst performance.

Figure 2:
FIG. 2 is a model showing states of Rh on the surface of a composite oxide in a binder material before and after a reduction treatment.

Specifically, as illustrated in FIG. 2, if the binder material were not subjected to a reduction treatment, most part of Rh would generally serve as oxidized Rh ($Rh_2O_3$) 16a and would be bonded to, or dissolved in, the CeZr-based composite oxide particles 15. In this case, the oxidized Rh 16a were bonded while spreading over the surface of the CeZr-based composite oxide particles 15 or being dissolved therein, i.e., the total surface area of Rh exposed from the CeZr-based composite oxide particles 15 would be small. On the other hand, in the binder material subjected to a reduction treatment, oxygen is dissociated from oxidized Rh ($Rh_2O_3$) 16a and dissolved Rh so that the oxidized Rh ($Rh_2O_3$) 16a and the dissolved Rh become a metal Rh16, and this metal Rh16 is deposited on the surface of the CeZr-based composite oxide particles 15 and is dispersed over the entire surface of the CeZr-based composite oxide particles 15. Consequently, the surface area of the metal Rh16 increases, and the surface that is in contact with exhaust gas increases accordingly. Thus, the number of active sites increases, thereby enabling efficient purification of the exhaust gas. As a result, the binder material is also provided with excellent catalyst performance.

On the other hand, the Pd-containing catalyst layer 3 includes, as catalytic materials, Pd-supporting CeZr-based composite oxide in which Pd13 is supported on CeZr-based composite oxide 11 and Pd-supporting alumina particles in which Pd13 is supported on alumina particles 12. The Pd-containing catalyst layer 3 also includes CeZr-based composite oxide 11 not loaded with Pd13. The Pd-containing catalyst layer 3 includes a zirconia binder material (Y-stabilized zirconia containing 3 mol % of $Y_2O_3$) 14 as a binder. The Rh-doped binder material 10 and the zirconia binder material 14 are smaller in particle size than other composite oxides serving as catalytic materials in order to function as binders. Specifically, a composite oxide constituting a binder has a particle size of about 200 nm or less in terms of median diameter.

The exhaust gas purification catalyst 1 can be prepared by the following method. First, a base material 2 is immersed in slurry as a mixture of a catalytic material constituting the Pd-containing catalyst layer 3, a binder material, and deionized water, and then is taken out from the slurry. Redundant slurry on the wall surface of the base material 2 facing the exhaust gas passage is removed with an air blow. Then, the slurry on the base material 2 is dried (at 150° C.) in the air and calcined (held at 500° C. for two hours). In this manner, a Pd-containing catalyst layer 3 is formed on the surface of the base material 2.

Thereafter, a Rh-doped CeZr-based composite oxide as a binder constituting the Rh-containing catalyst layer 4 is subjected to a reduction treatment. The reduction treatment can be performed by performing a heat treatment on the binder material at a temperature of 500° C. to 800° C., both inclusive, in a CO-containing reduction atmosphere. In this manner, a Rh-doped binder material is prepared.

Subsequently, the base material 2 including the Pd-containing catalyst layer 3 is immersed in slurry as a mixture of a catalytic material constituting the Rh-containing catalyst layer 4, a reduction-treated binder material, and deionized water, and then is taken out from the slurry. Then, similarly to the process for the Pd-containing catalyst layer 3, redundant slurry on the Pd-containing catalyst layer 3 is removed with an air blow, and dried (at 150° C.) in the air and calcined (held at 500° C. for two hours). In this manner, a Rh-containing catalyst layer 4 is formed on the surface of the Pd-containing catalyst layer 3 in the base material 2.

(Catalytic Material)

Preparation of the catalytic materials will now be described.

In the following description, a composite oxide in which Rh is supported on $ZrLaYO_x$ is used as an example of the Rh-supporting Zr-based composite oxide included in the Rh-containing catalyst layer 4. In this case, $ZrLaYO_x$ can be prepared by coprecipitation. Specifically, an eight-fold dilution of 28-mass % ammonia water is added to a nitrate solution as a mixture of a zirconium oxynitrate solution, nitric acid lanthanum, nitric acid yttrium, and deionized water, and the resulting solution is neutralized, thereby producing a coprecipitate. A solution containing this coprecipitate is subjected to centrifugation so as to remove supernatant liquid (dewatering). Thereafter, deionized water is added to the dewatered coprecipitate, and the resulting coprecipitate is stirred (washed). This process is repeated the necessary number of times. Then, the coprecipitate is dried in the air at 150° C. for 24 hours, is pulverized, and then is calcined in the air at 500° C. for two hours. In this manner, $ZrLaYO_x$ powder is prepared. The prepared $ZrLaYO_x$ powder is subjected to evaporation to dryness using a nitric acid rhodium aqueous solution, thereby allowing Rh to be supported on $ZrLaYO_x$. In this manner, Rh-supporting Zr-based composite oxide is prepared.

Then, a composite oxide in which Rh is supported on $CeZrNdLaYO_x$ will be described as an example of the Rh-supporting CeZr-based composite oxide included in the Rh-containing catalyst layer 4. In this case, $CeZrNdLaYO_x$ can also be prepared by coprecipitation. Specifically, an eight-fold dilution of 28-mass % ammonia water is added to a nitrate solution as a mixture of cerium nitrate hexahydrate, a zirconium oxynitrate solution, neodymium nitrate hexahydrate, nitric acid lanthanum, nitric acid yttrium, and deionized water, and the resulting solution is neutralized, thereby producing a coprecipitate. Similarly to the process described above, the solution containing this coprecipitate is dewatered and washed, and then dried and calcined. In this manner, $CeZrNdLaYO_x$ powder is prepared. The prepared $CeZrNdLaYO_x$ powder is subjected to evaporation to dryness using a nitric acid rhodium aqueous solution, thereby allowing Rh to be supported on $CeZrNdLaYO_x$. In this manner, Rh-supporting CeZr-based composite oxide is prepared.

A Rh-doped binder material as a binder material included in the Rh-containing catalyst layer 4 is obtained by performing a reduction treatment on Rh-doped CeZr-based composite oxide. Here, CeZrNdYO$_x$ is used as CeZr-based composite oxide. First, an eight-fold dilution of 28-mass % ammonia water is added to a nitrate solution as a mixture of cerium nitrate hexahydrate, a zirconium oxynitrate solution, neodymium nitrate hexahydrate, nitric acid yttrium, nitric acid rhodium, and deionized water, and the resulting solution is neutralized, thereby producing a coprecipitate. Similarly to the process described above, the solution containing this coprecipitate is dewatered and washed, and then dried and calcined. In this manner, Rh-doped CeZrNdYO$_x$ powder is prepared. Subsequently, the prepared powder is subjected to a heat treatment in a CO atmosphere. Thereafter, deionized water is added to this Rh-doped CeZrNdYO$_x$ powder so as to form slurry (with a solid content of 25 mass %). This slurry is placed in a ball grinder, and is pulverized with 0.5-mm zirconia beads for about three hours. In this manner, a sol in which Rh-doped CeZrNdYO$_x$ powder having a reduced particle size small enough to be used as a binder material is dispersed in a solvent is prepared. Through this process, the particle size of the Rh-doped CeZrNdYO$_x$ powder is reduced to 200 nm or less in terms of median diameter. In the pulverized Rh-doped CeZrNdLaYO$_x$ powder having a reduced particle size, Rh dissolved in the powder is exposed in a larger surface area than in unpluverized Rh-doped CeZrNdLaYO$_x$ powder. In addition, the surface area of the Rh-doped CeZrNdLaYO$_x$ powder is increased by pulverization, and thus, the Rh-doped CeZrNdLaYO$_x$ powder has a significantly enhanced catalyst performance though the Rh-doped CeZrNdLaYO$_x$ powder is a binder material.

On the other hand, the Pd-containing catalyst layer 3 also includes a CeZr-based composite oxide as described above, which can be prepared by the above process. As described above, Pd is supported on part of the CeZr-based composite oxide in the Pd-containing catalyst layer 3. In the Pd-containing catalyst layer 3, Pd is supported by evaporation to dryness using a nitric acid palladium solution, thereby preparing Pd-supporting CeZr-based composite oxide. In addition, Pd can also be supported on alumina particles by evaporation to dryness using a nitric acid palladium solution.

(Reduction Treatment)

In this embodiment, the Rh-doped binder material 10 serving as a binder material included in the Rh-containing catalyst layer 4 as described above is previously subjected to a reduction treatment, which is carried out by performing a heat treatment in a CO atmosphere. Here, in order to determine an optimum heat treatment temperature for a reduction treatment that can enhance catalyst performance, the state of Rh in CeZr-based composite oxide changing depending on the presence or absence of reduction treatment was analyzed by X-ray photoelectron spectroscopy (XPS). Tests performed for the determination will now be described.

First, CeZeNdO$_x$ was prepared as CeZr-based composite oxide. The composition of CeZrNdO$_x$ was CeO$_2$:ZeO$_2$:Nd$_2$O$_3$=23:67:10 (mass ratio). The prepared CeZrNdO$_x$ was doped with Rh or was allowed to support Rh. The amount of Rh used for doping or supported Rh in this case was 0.6 mass %. After preparation, the obtained composite oxide was divided into four samples, one of which is subjected to an XPS analysis (fresh), and two of which were subjected to a reduction treatment. The reduction treatment was conducted by performing a heat treatment at 600° C. for 60 minutes in a 1%-CO environment. Immediately after the reduction treatment, one of the two samples subjected to the reduction treatment was analyzed by XPS (immediately after reduction). The other of the two samples and the remaining sample not subjected to the reduction treatment were aged and subjected to a heat treatment at 1000° C. for 24 fours in an atmospheric gas heat treatment reactor (with 2% of O$_2$, 10% of H$_2$O, and residue of N$_2$). FIGS. 3A and 3B and Table 1 show results of an XPS analysis performed on these samples. The surface Rh concentration of CeZrNdO$_x$ in Table 1 was derived from a peak area in the XPS graph.

TABLE 1

| | SURFACE Rh CONCENTRATION (atomic %) | | |
|---|---|---|---|
| | IMMEDIATELY AFTER REDUCTION | AGING AFTER REDUCTION | AGING WITHOUT REDUCTION |
| Rh DOPING | 0.13 | 0.1 | 0.08 |
| Rh SUPPORTING | 0.25 | 0.06 | 0.04 |

As shown in FIGS. 3A and 3B, a reduction treatment increases a peak of a metal Rh, and the metal Rh is deposited on the surface of CeZrNdO$_x$. Table 1 shows that aging after the reduction treatment increases the amount of the metal Rh on the surface of CeZrNdO$_x$, as compared to aging without the reduction treatment. In the case of aging after the reduction treatment, a comparison between the case using Rh-doped CeZrNdO$_x$ and the case using a Rh-supporting CeZrNdO$_x$ shows that the amount of the metal Rh on the surface of CeZrNdO$_x$ is larger in the case using Rh-doped CeZrNdO$_x$ than that in the other case.

Based on the foregoing results, the reduction treatment allows the metal Rh to remain on the surface of CeZrNdO$_x$. In addition, it is suggested that the use of Rh-doped CeZrNdO$_x$ particularly increases the amount of surface metal Rh. The use of Rh-doped CeZrNdO$_x$ is supposed to obtain a binder material having higher exhaust gas purification efficiency.

Figure 4A:
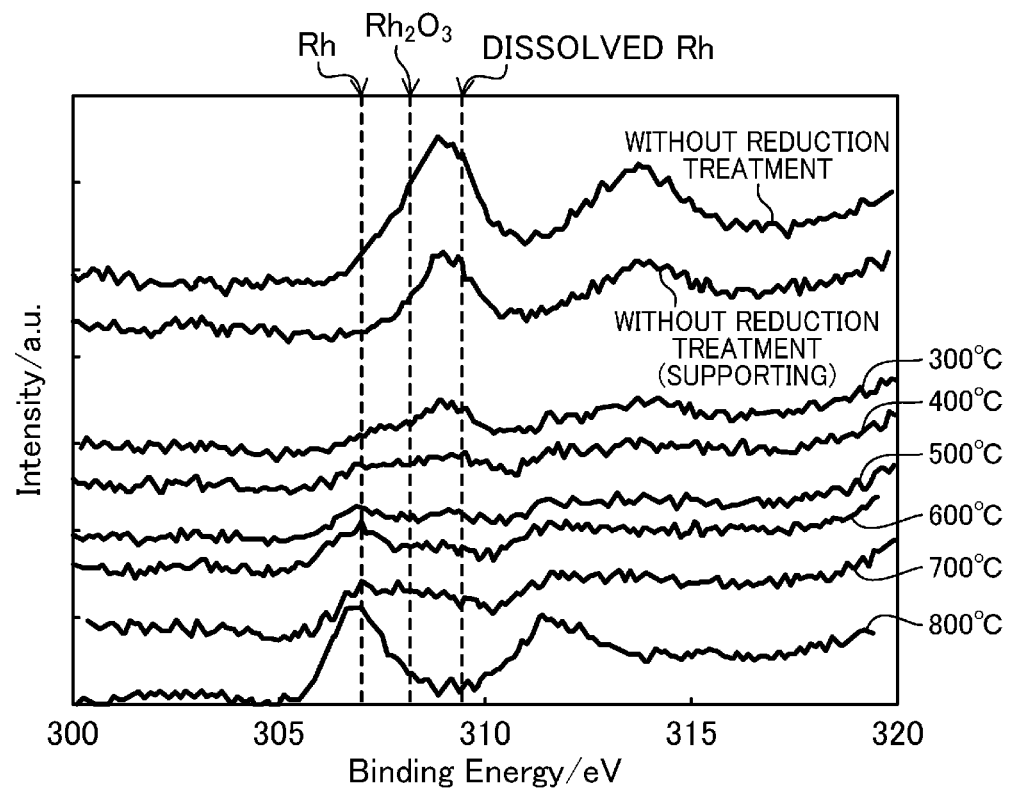
FIGS. 4A and 4B are graphs showing changes in properties of Rh caused by a reduction treatment on a Rh-doped binder material analyzed by X-ray photoelectron spectroscopy (XPS)

Now, in order to determine an optimum heat treatment temperature and an optimum heat treatment time for a reduction treatment, a reduction treatment was performed on Rh-doped CeZrNdO$_x$ at temperatures of 300° C., 400° C., 500° C., 600° C., 700° C., and 800° C., and the resulting samples were compared by analysis using XPS. The heat treatment temperature was 10 minutes. FIG. 4A shows the results.

As shown in FIG. 4A, at a heat treatment temperature of 500° C. to 800° C., the amounts of dissolved Rh and Rh$_2$O$_3$ decrease, and a peak of a metal Rh is observed. That is, FIG. 4A suggests that the heat treatment temperature of the reduction treatment is preferably in the range from 500° C. to 800° C., both inclusive.

Figure 4B:
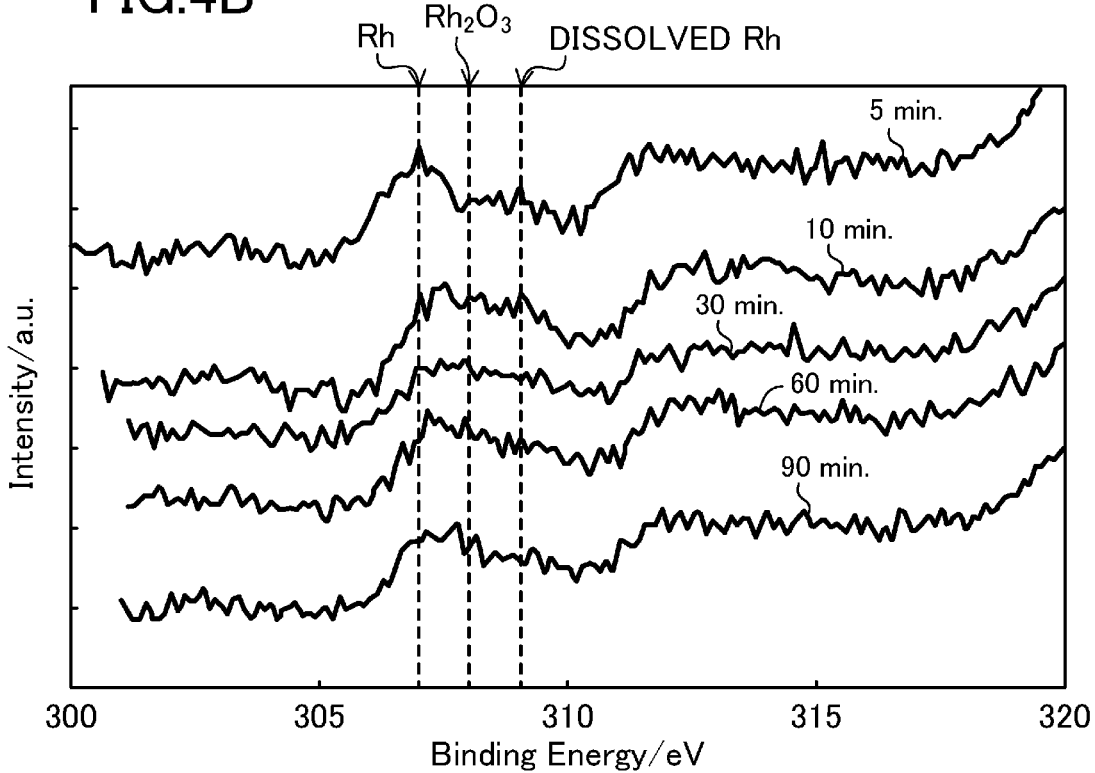

To determine a heat treatment time necessary for the reduction treatment, the temperature was fixed at 600° C., and the time was changed in the range from 5 minutes to 90 minutes. FIG. 4B shows the results.

As shown in FIG. 4B, a peak of the metal Rh was observed even at the shortest time of 5 minutes, suggesting that 5 minutes are enough at 600° C.

EXAMPLE

An example for describing the exhaust gas purification catalyst of the present disclosure in detail will now be described.

This example and a comparative example are both directed to the Rh-containing catalyst layer and the Pd-containing catalyst layer described above. Specifically, the Rh-containing catalyst layer included the Rh-supporting ZrLaYO$_x$, the Rh-supporting CeZrNdLaYO$_x$, the Zr-supporting La-containing alumina, and the Rh-doped binder material (Rh-containing CeZrNdYO$_x$). The composition ratio among these components was 21.1:63.3:7.0:8.6 (mass ratio). The composition of ZrLaYO$_x$ was ZrO$_2$:La$_2$O$_3$:Y$_2$O$_3$=84:6:10 (mass ratio), and 0.009 g/L of Rh was supported on this ZrLaYO$_x$ by evaporation to dryness using nitric acid rhodium. The composition of CeZrNdLaYO$_x$ was CeO$_2$:ZrO$_2$:Nd$_2$O$_3$:La$_2$O$_3$:Y$_2$O$_3$=10:75:5:5:5 (mass ratio), and 0.045 g/L of Rh was supported on this CeZrNdLaYO$_x$ by evaporation to dryness using nitric acid rhodium. The composition of CeZrNdYO$_x$ of the binder material was CeO$_2$:ZrO$_2$:Nd$_2$O$_3$:Y$_2$O$_3$=10:80:5:5 (mass ratio), and the content of Rh was 0.05 mass %.

On the other hand, the Pd-containing catalyst layer included Pd-supporting CeZrNdLaYO$_x$, Pd-unsupporting CeZrNdLaYO$_x$, Pd-supporting La-containing alumina, and a zirconia binder. The composition ratio among these components was 31.3:17.8:41.0:9.9 (mass ratio). The composition of CeZrNdLaYO$_x$ in the Pd-containing catalyst layer was CeO$_2$:ZrO$_2$:Nd$_2$O$_3$:La$_2$O$_3$:Y$_2$O$_3$=23:62:3:2:10 (mass ratio), and 0.04 g/L of Pd was supported on this CeZrNdLaYO$_x$ by evaporation to dryness using nitric acid palladium. On alumina, 0.2 g/L of Pd was supported by evaporation to dryness using nitric acid palladium.

In this example, a reduction treatment was performed on Rh-doped binder material. In this aspect, this example is different from the comparative example. Specifically, in this example, a reduction treatment was carried out by performing a heat treatment on Rh-doped binder material at 600° C. for 60 minutes in a 1%-CO environment.

After preparation of the exhaust gas purification catalysts of this example and the comparative example, an exhaust gas purification performance test was conducted on these catalysts. It will be described how the exhaust gas purification performance test was conducted.

First, the catalysts of this example and the comparative example were aged, and subjected to a heat treatment at 1000° C. for 24 hours in an atmospheric gas heat treatment reactor (with 2% of O$_2$, 10% of H$_2$O, and residue of N$_2$).

A core sample with a support capacity of about 25 mL (diameter: 25.4 mm, length: 50 mm) was then attached to a gas distribution reactor so as to measure light-off temperatures T50 (° C.) and exhaust gas purification efficiencies C400 for purification of HC, CO, and NO$_x$. A light-off temperature T50 (° C.) is a catalyst inlet gas temperature measured by gradually increasing the temperature of a model exhaust gas flowing in a catalyst from room temperature, detecting changes in concentration of HC, CO, and NO$_x$ contained in a gas flowing out of the catalyst, and measuring the temperature when the purification efficiency of each of the components reaches 50%. An exhaust gas purification efficiency C400 is a purification efficiency of each of HC, CO, and NO$_x$ when the model exhaust gas temperature at a catalyst inlet is 400° C.

The model exhaust gas was set at A/F=14.7±0.9. Specifically, a mainstream gas of A/F=14.7 was allowed to constantly flow, and a predetermined amount of gas for changing the A/F ratio was added in pulses at a rate of 1 Hz, thereby forcedly oscillating the A/F ratio in the range of ±0.9. Space velocity SV was 60000 h$^{-1}$, and a rate of temperature increase was 30° C./minute. Table 2 shows gas compositions when the A/F ratio was 14.7, 13.8, and 15.6.

TABLE 2

| | A/F | | |
|---|---|---|---|
| | 13.8 | 14.7 | 15.6 |
| C$_3$H$_6$ (ppmC) | 541 | 555 | 548 |
| CO (%) | 2.35 | 0.60 | 0.59 |
| NO (ppm) | 975 | 1000 | 980 |

TABLE 2-continued

| | A/F | | |
|---|---|---|---|
| | 13.8 | 14.7 | 15.6 |
| CO$_2$ (%) | 13.55 | 13.90 | 13.73 |
| H$_2$ (%) | 0.85 | 0.20 | 0.20 |
| O$_2$ (%) | 0.58 | 0.60 | 1.85 |
| H$_2$O (%) | 10 | 10 | 10 |
| N$_2$ | BALANCE | BALANCE | BALANCE |

Figure 5:
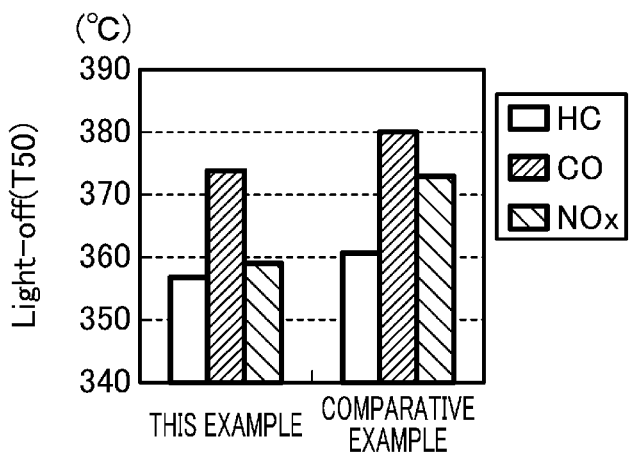
FIG. 5 is a graph showing light-off temperatures (T50) of an example of the present disclosure and a comparative example.
Figure 6:
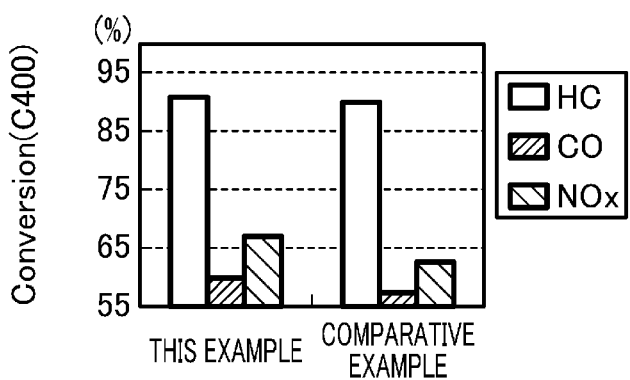
FIG. 6 is a graph showing purification performances (C400) in steady states of the example of the present disclosure and the comparative example.

Results of the exhaust gas purification performance test will now be described with reference to FIGS. 5 and 6. FIG. 5 is a graph showing temperatures T50 (° C.) of the catalyst of this example and the catalyst of the comparative example. FIG. 6 is a graph showing exhaust gas purification efficiencies C400 of the catalyst of this example and the catalyst of the comparative example.

Comparison between the temperature T50 of this example and the temperature T50 of the comparative example shows that the catalyst of this example can purify HC, CO, and NO$_x$ at lower temperatures than that of the comparative example, as shown in FIG. 5. This is because the reduction treatment on Rh-doped CeZrLaNdYO$_x$ binder material causes Rh in a metal state to be deposited on the surface of CeZrLaNdYO$_x$, and the surface area increases accordingly. Thus, the contact area that is in contact with exhaust gas increases, resulting in an enhanced purification efficiency.

Comparison between the exhaust gas purification efficiency C400 of this example and the exhaust gas purification efficiency C400 of the comparative example shows that the catalyst of this example has higher purification efficiencies of HC, CO, and NO$_x$ than that of the comparative example, as shown in FIG. 6. This is because of the same reasons as described above, i.e., the reduction treatment on the Rh-doped CeZrNdYO$_x$ binder material enhances catalyst performance.

The above results suggest that the use of reduction-treated Rh-doped CeZrNdYO$_x$ as a binder material can enhance exhaust gas purification performance of a catalytic material.

What is claimed is:

1. An exhaust gas purification catalyst in which a Rh-containing catalyst layer is provided on a base material, wherein
   the Rh-containing catalyst layer includes an Rh-doped binder in which Rh is contained in CeZr-based composite oxide containing Ce and Zr, and
   the Rh-doped binder includes Rh dissolved in the CeZr-based composite oxide, a metal Rh dispersed on a surface of the CeZr-based composite oxide and Rh$_2$O$_3$.

2. The exhaust gas purification catalyst of claim 1, wherein the Rh-containing catalyst layer includes Rh-supporting Zr-based composite oxide in which Rh is supported on Zr-based composite oxide containing Zr and a rare earth metal except Ce and Rh-supporting CeZr-based composite oxide in which Rh is supported on CeZr-based composite oxide containing Zr and Ce.

3. The exhaust gas purification catalyst of claim 2, wherein a Pd-containing catalyst layer is provided between the Rh-containing catalyst layer and the base material.

4. A method for producing the exhaust gas purification catalyst of claim 3, the method comprising:
   providing a Pd-containing catalyst layer on a surface of the base material;
   preparing Rh-supporting Zr-based composite oxide in which Rh is supported on Zr-based composite oxide containing Zr and a rare earth metal except Ce, Rh-supporting CeZr-based composite oxide in which Rh is supported on CeZr-based composite oxide containing Zr and Ce, and Rh-doped CeZr-based composite oxide obtained by dissolving Rh in CeZr-based composite oxide serving as a binder material;

performing a heat treatment on the Rh-doped CeZr-based composite oxide at a temperature of 500° C. to 800° C., both inclusive, in a reduction atmosphere containing CO, thereby preparing a Rh-doped binder material;

mixing the Rh-supporting Zr-based composite oxide, the Rh-supporting CeZr-based composite oxide, and the Rh-doped binder material together to produce a mixture, and making the mixture into slurry, thereby preparing a Rh-containing catalytic material; and providing the Rh-containing catalytic material on a surface of the Pd-containing catalyst layer.

5. The exhaust gas purification catalyst of claim 1, wherein a Pd-containing catalyst layer is provided between the Rh-containing catalyst layer and the base material.

* * * * *